United States Patent
Bronson

(10) Patent No.: US 7,148,914 B2
(45) Date of Patent: Dec. 12, 2006

(54) METHOD AND APPARATUS FOR PROVIDING SUBIMAGES TO REMOTE SITES

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 804 days.

(21) Appl. No.: 09/841,068

(22) Filed: Apr. 25, 2001

(65) Prior Publication Data

US 2004/0201677 A1 Oct. 14, 2004

(51) Int. Cl.
*H04N 5/225* (2006.01)
(52) U.S. Cl. .................................. 348/207.1
(58) Field of Classification Search ............. 348/207.1, 348/211.9
See application file for complete search history.

(56) References Cited

U.S. PATENT DOCUMENTS

| | | | |
|---|---|---|---|
| 6,069,655 A | 5/2000 | Seeley et al. | 348/154 |
| 6,097,429 A | 8/2000 | Seeley et al. | 348/154 |
| 6,166,763 A | 12/2000 | Rhodes et al. | 348/143 |
| 6,181,373 B1 | 1/2001 | Coles | 348/158 |
| 6,317,127 B1* | 11/2001 | Daily et al. | 345/629 |
| 6,567,121 B1* | 5/2003 | Kuno | 348/211.3 |
| 6,606,422 B1* | 8/2003 | Dulin et al. | 382/282 |
| 6,727,940 B1* | 4/2004 | Oka et al. | 348/211.3 |

* cited by examiner

*Primary Examiner*—Vivek Srivastava
*Assistant Examiner*—James M. Hannett

(57) ABSTRACT

Subimages are provided to remote sites by an image access system having an image sensor for sensing an image, and an image processing system for generating subimages from the sensed image. Users at a plurality of remotes sites can access the image access system, and can select a portion of the sensed image that they wish to view. The image sensor can be a sensor array for viewing a field of interest, and the users at the remote sites can pan and zoom electronically through the sensed image to select the subimage that they wish to view.

20 Claims, 4 Drawing Sheets

METHOD AND APPARATUS FOR PROVIDING SUBIMAGES TO REMOTE SITES

FIELD OF THE INVENTION

The present invention relates to providing images to remote sites. More particularly, the present invention relates to a method of and an apparatus for providing differing subimages of a sensed image to remote sites.

BACKGROUND

Transmission of images to remotes sites is known. One application for transmitting images to remote sites is a security system, in which one or more cameras are connected to a central station for monitoring.

Conventional security systems typically employ one or more cameras pointed at a particular field of interest, with a plurality of monitors in the central station being used to view the images from the cameras. The cameras are mounted on pan and tilt mechanisms, which allow security personnel to change the field of view of the cameras in order to view a particular field of interest.

While conventional security systems are useful in observing a desired field of interest, they require mechanical pan and tilt mechanisms to change the field of view of the cameras. In addition, if multiple personnel are viewing an image from a camera, only one person can control the field of view to be observed.

Another conventional method for transmitting images to remote sites is utilized in web-based applications. In the conventional method, persons accessing an image database or a live feed from a remote web server download images from the remote web server.

Web-based applications that operate in the above manner are inefficient in that a user at a remote site may only be interested in a portion of the image generally available from the web server, while the entire image is transmitted to the user. The transmission resources of the data path between the remote site and the web server are therefore wasted by transmitting image data that the user has no desire to view.

Therefore, a need exists for a method of providing images to remote sites that allows users at remote sites to independently view desired images, without wasting transmission resources.

SUMMARY OF THE INVENTION

The present invention overcomes the shortcomings of the conventional art and may achieve other advantages not contemplated by the conventional art.

According to a first aspect of the invention, an image access system includes an image sensor for sensing an image, and an image processing system operably coupled to the image sensor for receiving image data from the image sensor, and for generating and transmitting portions of the sensed image to remote sites. The portions of the sensed image are referred to as a "subimages" of the sensed image. The subimages are selected by users at the remotes sites.

According to a second aspect of the invention, a method of providing subimages to remote sites includes sensing an image of a scene, establishing a connection with remote sites, transmitting the sensed image to the remote sites, receiving selections of subimages of the sensed image to be viewed by the users at the remote sites, and transmitting the subimages to the remote sites.

According to the above aspects of the invention, an image access system can sense an image from a field of interest, and remote sites can access the image access system to view selected subimages from the sensed image. Further, because the users at the remote sites electronically select subimages from the sensed image, the image sensor does not need to be movably mounted to scan the field of interest.

As a further advantage, each remote site can select a subimage from the sensed image independent from the other remote sites.

A still further advantage results from transmitting selected subimages to remote sites, rather than the entire sensed image. Transmitting only the portion of the sensed image of interest to the user at the remote site conserves data path resources between the remote site and the image access system.

Other aspects and advantages of embodiments of the invention will be discussed with reference to the figures and to the detailed description of preferred embodiments.

DETAILED DESCRIPTION

An apparatus and a method for providing subimages to remote sites according to the present invention will be described below by way of preferred embodiments and with reference to the accompanying drawings.

Figure 1:
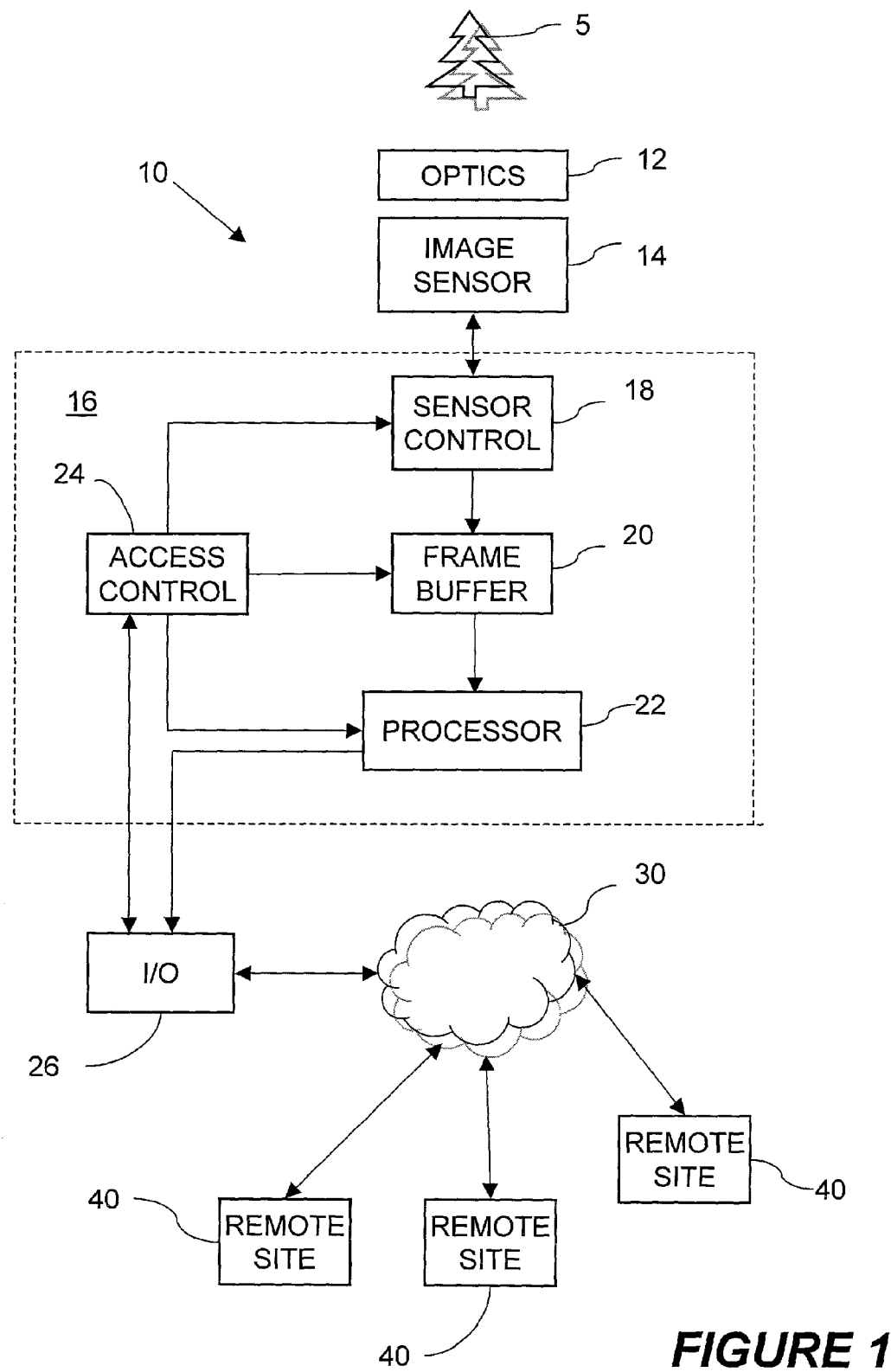
FIG. 1 is a schematic view of an image access system according to an embodiment of the invention.

FIG. 1 is a schematic view of an image access system 10 according to an embodiment of the invention. The image access system 10 comprises optics 12, an image sensor 14 disposed to sense images from a scene 5 through the optics 12, an image processing system 16 for generating and transmitting subimages using image data from the image sensor 14, and an input/output (I/O) device 26.

The image processing system 16 includes an access control 24 that performs general management functions for the image access device 10. The access control 24 is coupled to the I/O device 26 to receive requests from remote sites 40, and is coupled to a sensor control 18, a frame buffer 20, and a processor 22, to control the transmission of images to the remote sites 40. The I/O device 26 is coupled to the remote sites 40 through a connection medium 30. The sensor control 18 is coupled to the image sensor 14 for receiving image data, and coupled to the frame buffer 20 to transmit selected images to the frame buffer 20. The frame buffer 20 is coupled to the processor 22 to transmit images to the processor 22 for formatting before transmission to the I/O device 26.

Figure 2:
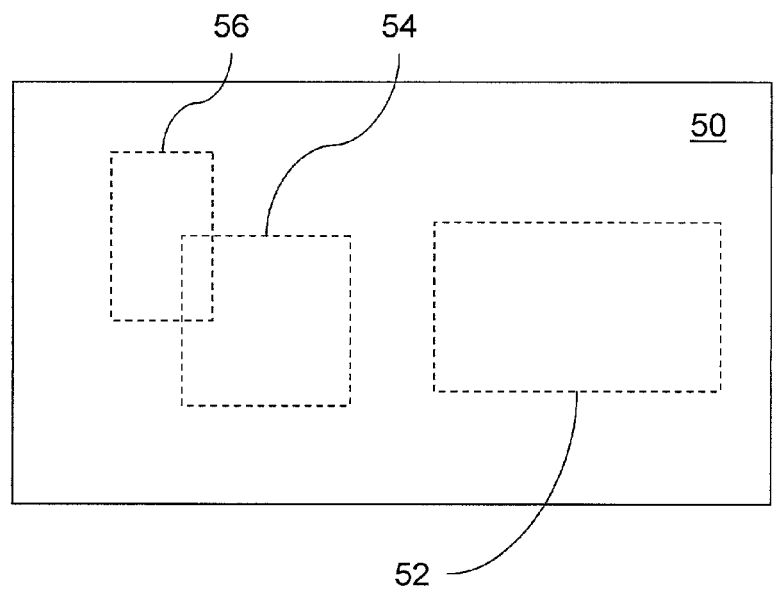
FIG. 2 illustrates selection of subimages from a sensed image.

The general functions of the elements of the image access device 10 will be discussed below with reference to FIGS. 1 and 2. A remote site 40 establishes a connection with the image access system 10 through the I/O device 26. The I/O device 26 transmits the request for connection to the access control 24, where the access control 24 determines characteristics of the remote site 40. The access control 24 instructs the sensor control 18 to provide an image of the scene 5 sensed by the image sensor 14 to the remote site 40. The sensor control 18 transmits the sensed image to the frame buffer 20, and the sensed image is then transmitted to the processor 22 for formatting. The formatted sensed image is transmitted to the remote site 40 via the I/O device 26 and the connection medium 30, and the remote site 40 displays the sensed image 50 (FIG. 2). The user at the remote site 40 selects a subimage 52 of the sensed image 50, and transmits a request to view the subimage 52 to the access control 24 via the connection medium 30 and the I/O device 26. The access control 24 instructs the sensor control 18 to obtain the image data of the subimage, and to transmit it to the remote site 40, where the subimage 52 is displayed.

Referring to FIG. 2, a user at a remote site 40 can select the subimage 52 from the sensed image 50, while another user at another remote site 40 can select a subimage 54, 56, or any other subimage, from the sensed image 50. Any subimage may be transmitted to one or more of the remote sites 40. For the purposes of this specification, the term "subimage" is intended to indicate a particular portion of a sensed image, rather than a single, static frame of an image. Both the sensed image and subimages may be transmitted to remotes sites as a series of frames. Once the user has chosen a subimage from the sensed image 50, the image access device 10 may provide updated, or refreshed, frames of the subimage, as the image sensor 14 senses sequential frames of the sensed image 50. A user at a remote site 40 can therefore view a sensed image or a subimage in real time. While viewing, for example, the subimage 52, the user can also select a new subimage 54, 56, or any other subimage, from the sensed image 50.

In FIG. 1, three remote sites 40 are shown for illustrative purposes, and it is within the scope of the invention for the image access system 10 to provide subimages to any number of remote sites 40. A remote site 40 can be any site capable of displaying image data and capable of transmitting data over the connection medium 30.

According to the embodiment illustrated by FIG. 1, the image sensor 14 may include a relatively high resolution, wide field of view sensor array. In general, the image sensor 14 may be directed towards a field of view containing the scene 5 to be observed. By accessing the image access system 10, users at the remote sites 40 can either view a sensed image of the entire scene 5, or they may view subimages of the sensed image. A wide field of view sensor 14 is particularly desirable in applications such as, for example, an area security system, where a large area must be monitored. Other applications, such as monitoring large outdoor events (parades, etc.), classrooms, or similar environments, may also require a wide field of view sensor. In general, the field of view of the image sensor 14 can be tailored to accommodate the activity or area to be monitored.

Because the image sensor 14 may be of relatively high resolution, users at the remote sites 40 can observe a wide field of view, and can select subimages from the sensed image that are of satisfactory resolution. A further advantage is that by observing a wide field of view, there is no need for mechanical steering servomechanisms to steer the image sensor 14. Instead, a user at a remote site 40 can pan and zoom electronically through the sensed image, and select a desired subimage without mechanical movement of the image sensor 14.

The image sensor 14 may alternatively have a relatively small field of view. A small field of view may be desirable for observing, for example, medical procedures, astronomical images, presentations of data, and other activities or regions where the field of interest is relatively small. In these types of applications, the field of view of the image sensor 14 may be tailored to the size of the activity observed, and the resolution of the image sensor 14 may also be tailored so that a desired degree of resolution may be obtained for subimages transmitted to the remote sites 40.

The image sensor 14 can comprise any sensor array capable of receiving energy reflected from or emitted by an image 5. For example, the image sensor could be an optical sensor, such as a charge coupled device (CCD), or a CMOS imaging array, and may, for example, be incorporated into a camera. For some applications, such as in a telescope used for astronomical observation, the image sensor 14 could be a radio frequency or ultraviolet sensor array. An infrared sensor may also be used for applications such as security devices, where night vision may be required.

The resolution of the image sensor 14 is dependent upon the degree of resolution required by the users at the remote sites 40. For example, for viewing a surgical procedure, it may be desirable to use a CCD camera having a relatively narrow field of view, which may be, for example, between 1 and 20 degrees, and having a CCD sensor array with a resolution of between, for example, 10,000 and 100,000 pixels per inch.

It may also be desirable to utilize a high resolution image sensor 14 to observe a large field of view. This application may be required for monitoring outdoor events or other large gatherings in which it may be necessary to focus on specific locations, objects, or persons. If a sufficiently large field of view is to be monitored, the image sensor 14 can be constructed of a plurality of sensor arrays arranged in a tiled fashion so as to constitute a single image sensor 14. The image data from the individual arrays may be formatted as a single sensed image at the sensor control 18. If an array of tiled sensor arrays is used to form the image sensor 14, the natural demarcations between the tiled arrays can be presented to the users at the remote sites 40 as a dividing line between predetermined subimages. Alternatively, users may be allowed to select any desired subimage from the sensed image.

In applications such as the use of the image access system 10 in conjunction with a telescope for astronomical observation, the field of view for the image sensor 14 may be relatively narrow, on the order of, for example, 1 to 30 seconds of arc. It would also be desirable to use a relatively high resolution sensor array in the image sensor 14, which may be on the order of, for example, between 10,000 and 100,000 pixels per inch. The field of view of the image sensor 14, as modified by the optics 12, is selected such that the image sensor 14 does not require mechanical steering in order to observe a region of interest, while allowing users at remote sites 40 to observe subimages within the field of view.

The image sensor 14 can include a controller for an iris for the image sensor's sensor array, a focus and aperture control, control functions for scanning rate, active gain control, and refresh rate, and other standard array control functions.

The optics 12 may be any lens arrangement suitable for modifying images.

Examples of lens arrangements providing a wide field of view include wide angle lenses, and fish eye lenses. If the optics 12 includes a "fish eye", or some other wide field of view lens utilizing distortion, a wider field of view can be observed by the image sensor 14. A distortion compensation algorithm or a correction table may be applied to the image data of the sensed image to compensate for distortion from a lens with distortion. If a wide field of view lens is utilized in the optics 12, it is preferable to increase the resolution of the image sensor 14, so that users at the remote sites 40 have access to subimages of sufficient resolution.

The sensor control 18 is coupled to the image sensor 14 to receive image data of a sensed image from the image sensor 14, and to provide image data of either a sensed image or a subimage to the processor 22. The sensor control 18 may be, for example, a control processor utilizing routines such as array access and control routines. The image sensor 14 transmits the sensed image to the sensor control 18 in, for example, analog format. The sensor control 18 can include, for example, a graphics processing system, for converting the image data from the image sensor 14 into, for example, byte serial digit format, for transmission to the processor 22. The sensor control 18 is responsive to the access control 24 to obtain data for either a sensed image or a selected subimage for transmission to the processor 22, and for eventual transmission to a remote site 40 on a channel assigned to the remote site 40. The sensor control 18 is illustrated in further detail in FIG. 3.

Figure 3:
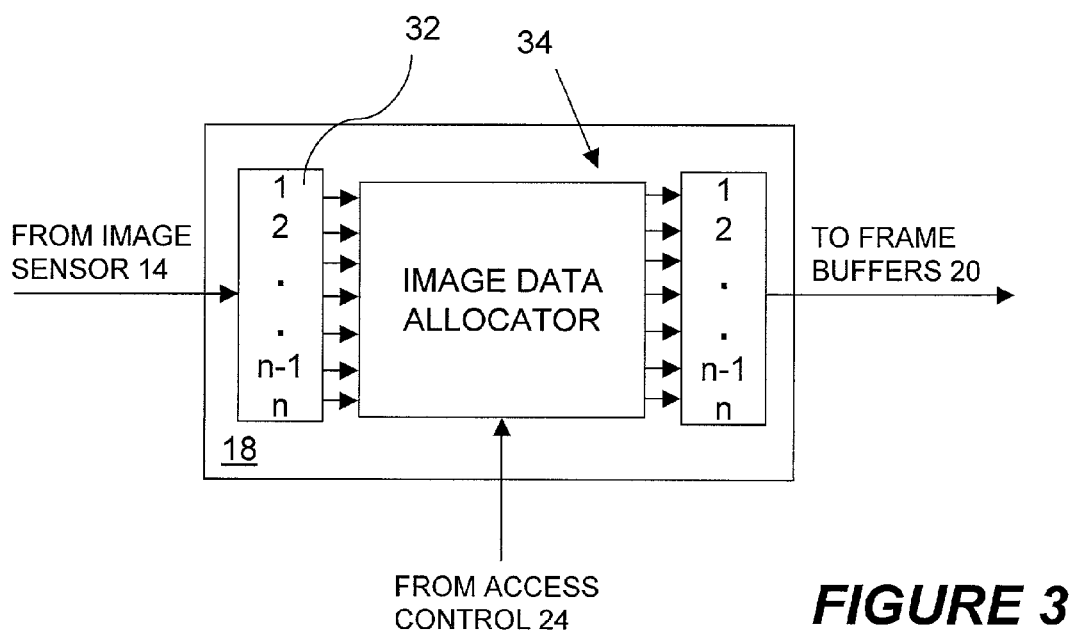
FIG. 3 is a schematic view of a sensor control according to an embodiment of the present invention.

FIG. 3 is a schematic view of the sensor control 18. The sensor control 18 comprises a buffer 32 for storing image data from the image sensor 14, and an image data allocator 34 for allocating image data to channels 1–n. The sensor control 18 is responsive to requests for specific subimages, and other requests, from the remote sites 40, as communicated by the access control 24.

The buffer 32 can include at least n parallel buffers, a buffer corresponding to each of the n channels for communicating images to the remote sites 40. Therefore, when the user at a remote site 40 requests to view a subimage, the access control 24 transmits the request to the sensor control 18, the sensor control 18 selects the image data (or, more specifically, "subimage data") corresponding to the subimage from one of the n buffers, and transmits it to the frame buffer 20 via a channel assigned to the remote site 40. The access control 24 interprets the user's request for a particular subimage as a location of the sensed image, and transmits this location to the sensor control 18. The location describing the subimage may be described in terms of, for example, row and column values on the image sensor 14. The sensor control 18 can select the appropriate data using, for example, a block of pixels between two pairs of diagonally opposed coordinates.

Alternatively, the buffer 32 can include a buffer having multiple ports, from which the image data allocator 34 can draw the subimage data of requested subimages, and transmit each subimage on its appropriate channel to the frame buffer 20, for eventual transmission to the requesting remote sites 40.

The characteristics of the n channels, which can be described in terms of, for example, bandwidth, update rate, and image optimization characteristics such as real time capability, high resolution capability, update rate, and color depth, may vary. Channels may be configured to allow multiple remote sites 40 to be assigned to one channel, by, for example, multiplexing. The access control 24 may assign multiple remote sites 40 to a single channel if the transmission requirements for the remote sites 40 can be accommodated by the channel.

The access control 24 is responsible for receiving requests from the remote sites 40, determining whether the remote sites 40 are authorized to access the image access system 10, assigning priority levels to the remote sites 40, assigning channels to the remote sites 40, and performing other management functions such as determining a level of exclusivity of the remote sites 40. The access control 24 can include, for example, access and security verification and control routines. The access control 24 may include one or more input ports that are coupled to the I/O device 26, to receive communications from the remote sites 40.

The access control 24 can include one or more authorization routines, such as password or biometric verification. When a remote site 40 accesses the image access system 10 through the connection medium 30, the user at the remote site 40 may be asked to provide a user ID, an access code, or other identifying data, before being provided access to the sensed image or other options available from the image access system 10.

The access control 24 may also include one or more priority routines. Using the priority routines, the access control 24 can allocate resources of the image access system 10 according to a level of priority assigned to a particular remote site 40. For example, the image access system 10 may be provided to certain users at remote sites 40 for a fee, and the fee may vary according to a desired level of service. Alternatively, certain users, such as government agencies, may be afforded a high priority level based upon, for example, emergency status, national security, and other factors affecting the public interest. The priority routines allow the access control 24 to assign resources, such as preference in being assigned a channel, channel bandwidth, refresh rate, and other variables, according to the priority level of the remote site 40.

The image access system 10 can transmit subimages on a finite number of channels. Therefore, during periods of particularly high demand, certain remote sites 40 may be denied access to a desired subimage because a channel is not available for use. Alternatively, the remote site 40 may be given the option to view a subimage currently being viewed at another remote site 40 that has been assigned a channel. A remote site 40 may elect to "share" another remote site's image data if, for example, the subimage transmitted to the other remote site 40 is of interest to the user at the remote site 40 that was denied a channel assignment. If a user at a remote site 40 does not wish for another user to view his subimage selection, the user may request of the access control 24 that her assigned channel not be shared with other remote sites 40. This "exclusivity" option can be available based upon, for example, priority level, or, exclusivity may be made generally available to all remote sites 40.

A user at a remote site 40 may also elect to specifically identify his subimage selection by his user ID, by name, or by some other identifying indicia. This feature would allow other users, such as students, to view the subimages selected by the identified user. To facilitate viewing of an identified user's subimages, the access control 24 can provide a prompt or a menu allowing users at remote sites 40 to select among identified users.

Depending upon the nature of the sensed image, the access control 24 can also restrict certain remote sites 40 to certain regions of the sensed image, and may allow the remote sites 40 to view subimages only from authorized portions of the sensed image.

The frame buffer 20 temporarily stores subimages transmitted on the n channels for eventual transmission to the processor 22. The frame buffer 20 can comprise a plurality of parallel buffers, each buffer being assigned to a particular channel. Alternatively, the frame buffer 20 can be one or more buffers, with the frame buffer 20 having at least n ports for transmitting subimages on the n channels. The access control 24 is coupled to the frame buffer 20 to control the transmission of subimages to the processor 22. The frame buffer 20 may also perform some formatting of subimages, such as scaling and normalization.

The processor 22 receives subimages from the frame buffer 20 and formats them for transmission to the remote sites 40 via the I/O device 26 and the connection medium 30. The processor 22 may have MPEG encoding functionality for scaling, compressing, and performing other tasks on the subimages so that they are suitable for use by the remote sites 40. After formatting the subimages, the processor 22 transmits the subimages to the I/O device 26, where the subimages are subsequently transmitted to the connection medium 30.

The elements comprising the image processing system 16 are all illustrated as individual elements for the purposes of illustration. However, one or more of these elements can comprise routines or instructions stored on and executable by, for example, a central processing unit or units of the image processing system 16. The terms "transmit," "transmission," and variations thereof, are used broadly in this specification to generally describe the passage of data, and are not specifically intended to require the passage of data through a cable, the airwaves, or any other specific medium.

The image access system 10 is adapted to transmit images through a variety of connection media. For example, the connection medium 30 may be the Internet, an intranet, a direct cable connection, a satellite network, or other media for connecting remote sites.

Figure 4:
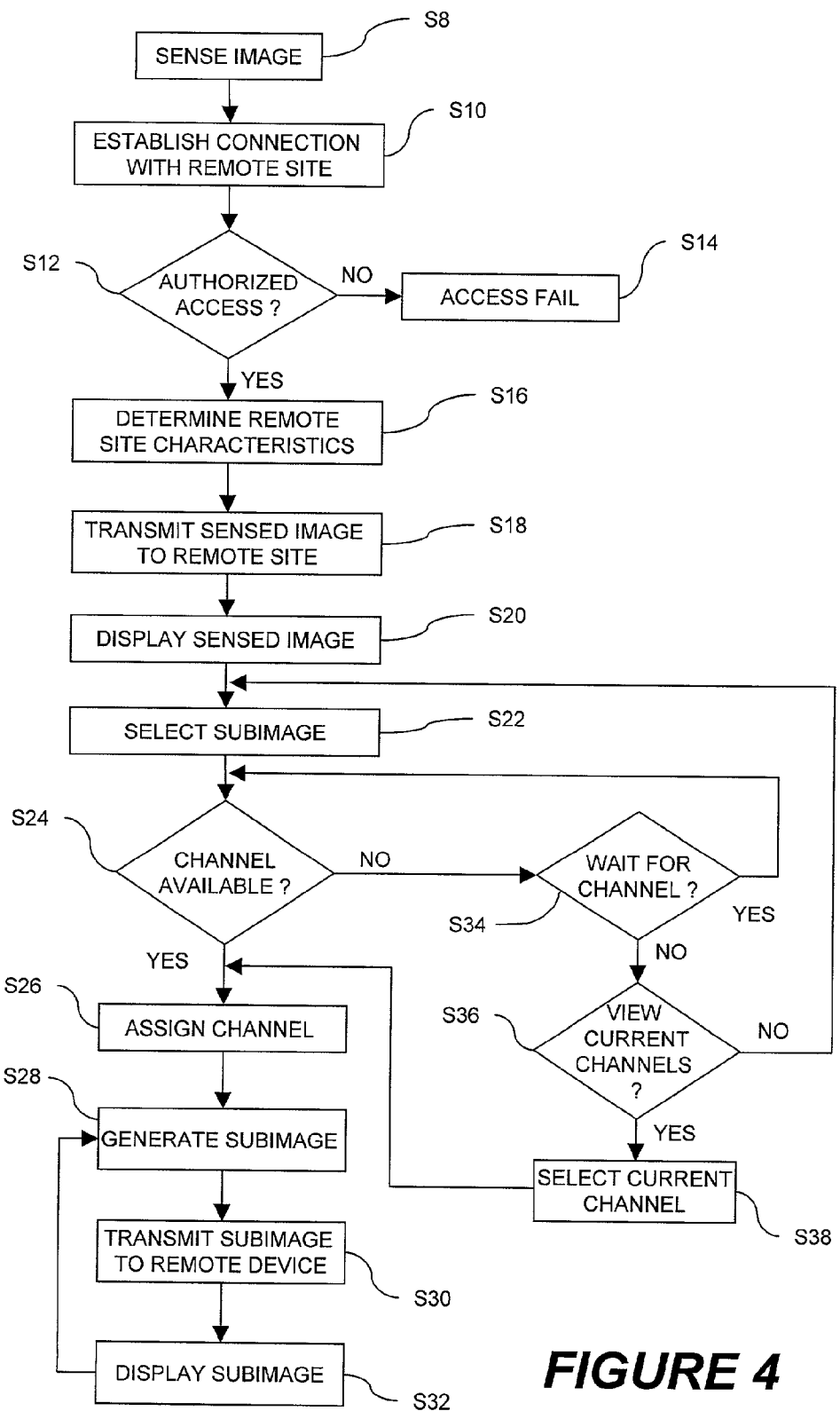
FIG. 4 is a flow chart illustrating a method of providing subimages to remote sites according to an embodiment of the invention.

A method of providing images using the image access system 10 will now be discussed with reference to FIGS. 4 and 5. In the discussion below, the method describes providing images to a single remote site 40. It is to be understood that the image access system 10 can simultaneously provide images to a plurality of remote sites 40.

In Step S8, the image access system 10 senses an image of the scene 5 using the image sensor 14. The sensed image can be a static image, or, it may constitute a series of frames of the scene. As long as the image access system 10 is operating, the image sensor 14 can substantially continuously sense images from the scene 5.

In step S10, a remote site 40 transmits a request to connect to the image access system 10 via the connection medium 30. If the connection medium 30 is the Internet, the request may be transmitted by, for example, entering a universal resource locator (URL) address for the image access system 10. The I/O device 26 transmits the remote site 40 request to the access control 24, and the access control 24 determines whether the remote site 40 is authorized to access the image access system 10 in step S12. The access control 24 can establish remote site authorization by, for example, requesting a user name and/or password from the remote site 40.

If the remote site 40 cannot provide a proper user name and/or password, the access control 24 notifies the remote site 40 that its attempt to access has failed in step S14. At this time, the access control 24 can terminate the connection with the remote site 40. Alternatively, the access control 24 can prompt the remote site 40 to reenter its user name and/or password.

If the access control 24 determines that the remote site is authorized to access the image access system 10, the access control 24 determines the remote site 40 characteristics in step S16. The characteristics of the remote site 40 can include, for example, priority level, exclusivity level, a preference for certain channel characteristics, a preference for certain transmission characteristics, and the preference to have the subimages associated with the user's name or user ID. The characteristics can be requested of the remote site 40 by the access control 24, or, they may have been provided on a previous access, and may be stored within the access control 24.

When the access control 24 has determined the characteristics of the remote site 40, the access control 24 instructs the processor 22 to transmit the sensed image to the remote site 40 in step S18. The remote site displays the sensed image in step S20. The sensed image transmitted to the remote site 40 can have many forms. For example, the sensed image may be the entire image sensed by the image sensor 14. The sensed image could also be the entire image sensed by the image sensor 14, minus any restricted areas that the remote site 40 is not authorized to view.

The sensed image could also be a symbolic representation of the field of view that the image sensor 14 senses. For example, if the image sensor were used in an astronomical observatory, the sensed image may represent quadrants of a telescope's field of view. Transmitting a symbolic representation of the image sensor 14 field of view may enable the user at the remote site 40 to more quickly identify the subimage that the user wishes to view. In addition, a symbolic representation of the sensed image may require less data path resources to transmit over the connection medium 30.

The sensed image may be made generally available to all authorized remote sites 40 via the processor 22, prior to assigning channels to the remote sites 40. Therefore, channels within the image access system 10 are not wasted on remote sites 40 that choose not to select a subimage from the sensed image. In that case, the user at the remote site 40 can simply disconnect from the image access system 10.

In step S22, the user at the remote site 40 selects a subimage from the sensed image, and transmits the selection to the access control 24. When selecting a subimage of the sensed image, the user at the remote site 40 can select from, for example, predetermined quadrants or sectors of the sensed image. The user at the remote site 40 can alternatively select a portion of the sensed image using, for example, a mouse, a keyboard, and electronic pen devices interacting with sensitive viewing screens. In selecting a subimage, the user can pan across the sensed image, and may zoom in on a particular portion of the sensed image before selecting a subimage.

Depending upon the priority level of the remote site 40, the user may also change the transmission characteristics of the subimage to be transmitted during the selection of a subimage. For example, upon viewing the sensed image, the user at the remote site 40 may decide to change the resolution, update rate, real time capability, the pixel rate, color depth, or other transmission characteristics of the subimage, based upon the particular image that he wishes to view.

In step S24, the access control 24 determines whether a channel is available to transmit the selected subimage to the remote site 40. If a channel is available, the access control 24 assigns a channel to the remote site in step S26. As an alternative to assigning a channel to the remote site 40 after selecting a subimage, the remote site 40 may be assigned a channel upon connecting with the image access system 10.

Each remote site 40 may be assigned to a single channel, or depending upon the channel characteristics, one or more remote sites 40 may be multiplexed to a single channel. The plurality of channels are preferably configured so that they are able to convey image data of the sensed image, and subimages, having a desired resolution, color depth, update rate, pixel rate, color depth, and other image characteristics. The channels need not be identical, and certain channels may have, for example, different optimization characteristics or bandwidth than other channels. Channels with certain characteristics, such as real time capability, or high resolution, could be reserved for remote sites having a higher priority level.

The channels can be digital channels, in which the channel characteristics vary. Alternatively, the channels can be hard wired. If digital channels, or other variable channels are used, the characteristics of a channel can be altered in order to accommodate certain remote sites 40, or to accommodate the assignment of additional remote sites 40 to a channel.

Rather than denying access to the image access system 10 due to a lack of channel availability, the access control 24 can also reconfigure the transmission characteristics of one or more remote sites 40 so that the image access system 10 can accommodate more remote sites 40.

In step S28, the image access system 10 generates the subimage for transmission to the remote site 40. The process of generating a subimage is discussed in detail with reference to FIG. 5. Once the subimage has been generated in step S28, the image access system 10 transmits the subimage to the remote site 40 in step S30. The remote site 40 displays the subimage in step S32.

The return arrow from step S32 to step S28 indicates that frames of the selected subimage may be continuously generated and transmitted to the remote site 40. If the subimage is a static image, the image processing system 16 may not refresh the subimage, and the image displayed at the remote site 40 would not change.

If the user at the remote site 40 wishes to view a different subimage, he may select a different subimage at any time. If the user selects a new subimage, the sensor control 18 obtains image data from a different portion of the sensed image when generating the subimage in step S28. The user at the remote site 40 may also change the transmission characteristics of the subimage at any time, subject to priority level and channel availability.

Referring again to step S24, if there is no channel available for the remote site 40, the access control 24 asks the remote site 40 whether the access control 24 should wait for an available channel in step S34. If the user at the remote site 40 decides to wait for an available channel, the access control 24 periodically monitors the availability of channels, and assigns a channel to the remote site 40 in step S26 when a channel becomes available.

If the user at the remote site 40 indicates that he does not want to wait for a channel to become available, in step S36, the access control 24 asks the user whether he is willing to view subimages currently being transmitted to another remote site 40 that is assigned a channel. If the user at the remote site 40 does not want to view another user's subimages, he is returned to step S22, where he may select a new subimage, attempt to select his original subimage choice, or, he may elect to disconnect from the image access system 10.

If the user at the remote site 40 that is not assigned a channel wishes to view another remote site's subimages, the access control 24 selects a channel that approximates the user's original subimage selection in step S38. For example, the access control 24 can include a routine to match the user's preference for a region of the sensed image, and transmission characteristics, to a subimage currently being transmitted on a channel assigned to another remote site 40. The remote site 40 is then "assigned" this channel in a limited capacity in step S26. The remote site 40 sharing another site's channel is limited in that it may only observe the subimages transmitted on the channel, and may not alter the subimage.

The access control 24 instructs the processor 22 to transmit the subimages to the remote site in step S30. The processor 22 can include a number of output ports that exceeds the number of channels n of the image processing system 16. This allows the processor 22 to transmit duplicate subimages to users at remote sites 40 who are sharing the subimages communicated on channels assigned to other remote sites 40.

Figure 5:
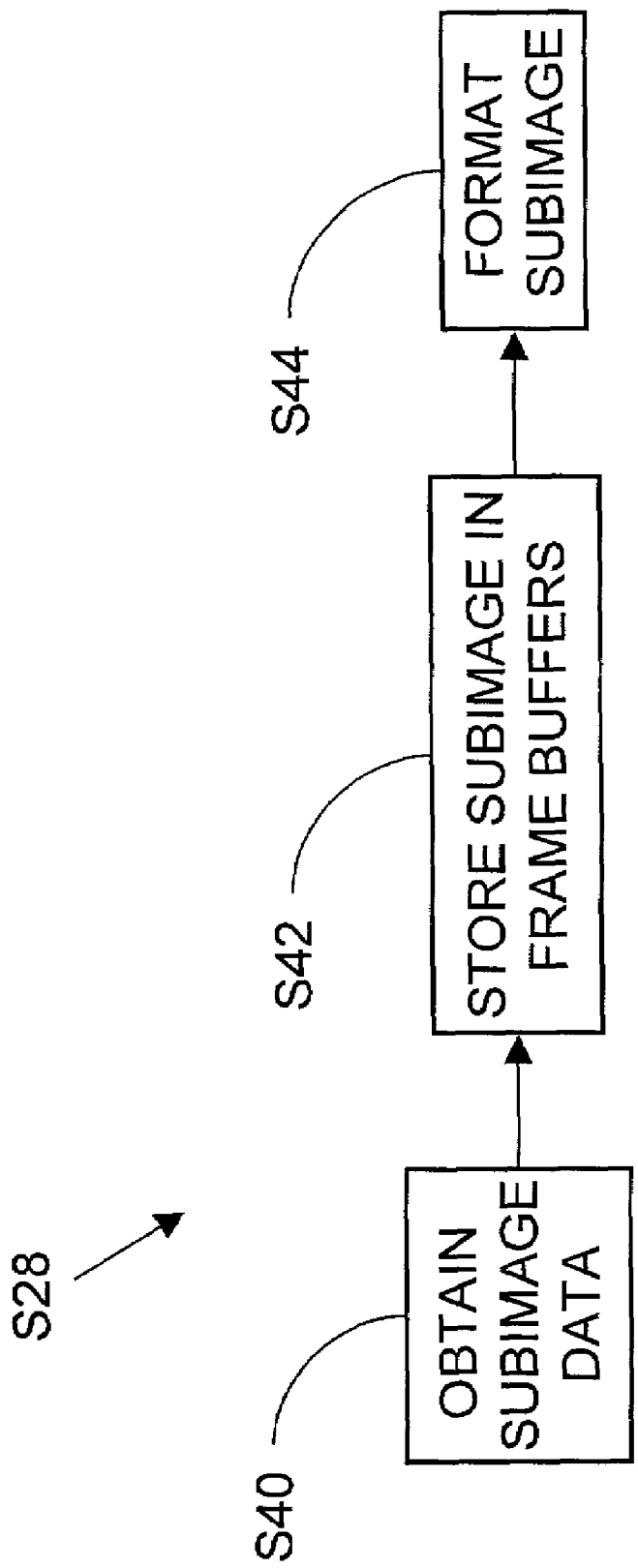
FIG. 5 is a flow chart illustrating generation of subimages.

FIG. 5 is a flow chart illustrating in detail the step S28 of generating subimages. In step S40, in response to the access control 24 transmitting the remote site 40 selection for a subimage, the image data allocator 34 obtains subimage data from the buffer 32 (FIG. 3) corresponding to the user's subimage selection. The subimage data in the buffer 32 may be in, for example, analog format, and the image data allocator may perform formatting functions such as, for example, byte serial digital formatting. The image data allocator 34 then transmits the subimage data on the channel assigned to the remote site 40 to the frame buffer 20.

The subimages communicated by the assigned channel are then temporarily stored in the frame buffer 20 in step S42. The frame buffer 20, may, for example, perform some formatting functions operations on the subimage data. For example, the frame buffer 20 could scale and normalize the subimage. The access control 24 can control the transmission of subimages to the processor 22, or, the frame buffer 20 can independently control the transmission of subimages to the processor 22.

In step S44, the processor 22 formats the subimages transmitted on the assigned channel for transmission to the I/O device 26. The formatting can include, for example MPEG encoding functions such as, for example, scaling, compressing, and other tasks that renders the subimage data appropriate for use by the remote sites 40.

The embodiments of a method of and apparatus for providing subimages to remotes sites discussed above have many practical applications. For example, one embodiment of the present invention could be employed for medical training. In this embodiment, a surgeon at a remote site could deploy an image sensor 14 to focus on a patient during an operation. Other medical personnel, located at remote sites 40, could connect via the connection medium 30, and could view the operation by accessing the image access system 10. The medical personnel at the remote sites 40 would not be restricted to any particular region of the image sensed from the operation, and could electronically pan and zoom on particular subimages of interest. In this embodiment, the image sensor 14 could have a relatively narrow field of view, sufficient to view the surgical procedure.

Another embodiment of the present invention could be used to train security or other law enforcement personnel. For example, trainees at remote sites 40 could view a sensed image selected by a trainer. The image sensor 14 used to sense the image can have a wide field of view, so that the sensed image captures a variety of actions. The trainees may be asked to detect suspicious or unlawful activity, and to select a subimage to more carefully monitor the activity.

The present invention may also be used in the field of astronomy. Given the high cost of building and operating modem high power telescopes, it is preferable to allow as many users as possible access to each telescope's gathered images. According to an embodiment of the present invention, the image sensor 14 could be coupled to the optics of a telescope at, for example, an observatory. In this application, the image sensor 14 may have a relatively small field of view, sufficient to sense a field of view captured by a telescope. The image access system 10 could utilize the image sensed by the telescope as the sensed image, and could allow users at remote sites 40 to view subimages of the sensed image, thereby maximizing the use of the telescope.

The steps of the above embodiments can be implemented with hardware or by execution of programs, modules or scripts. The programs, modules or scripts can be stored or embodied on one or more computer readable mediums in a variety of formats, such as source code, object code or executable code, for example. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method of providing images to remote sites, the method comprising:
   sensing an image of a scene using an image sensor;
   establishing a connection with the remote sites;
   transmitting the sensed image to the remote sites, the sensed image always including the entire sensible range of the image sensor;
   receiving a selection of a subimage of the sensed image from each of the remote sites;
   generating subimages from the sensed image; and
   transmitting the subimages to the remote sites.

2. The method of claim 1, comprising:
   determining whether the remote sites are authorized to receive images.

3. The method of claim 1, comprising:
   determining at least one of a priority level and an exclusivity level of the remote sites.

4. The method of claim 1, comprising:
   determining whether a channel is available for transmitting the subimages to each of the remote sites.

5. The method of claim 4, comprising:
   transmitting a message to a particular remote site asking whether the particular remote site is to receive the subimages transmitted on a channel assigned to another remote site.

6. The method of claim 1, wherein the step of generating the subimages comprises:
   generating a series of frames of each of the subimages.

7. The method of claim 6, wherein the step of transmitting the subimages comprises:
   transmitting the series of frames of each of the subimages to the remote sites.

8. A method of providing images to a plurality of remote sites, the method comprising:
   sensing an image of a scene using an image sensor;
   establishing connections with the remote sites;
   transmitting the sensed image to the remote sites, the sensed image always including the entire sensible range of the image sensor;
   receiving a selection of a subimage from each of the remote sites;
   assigning each of the remote sites to a channel;
   generating the subimage selected at each remote site; and
   transmitting the subimages to their respective remote sites.

9. The method of claim 8, comprising:
   determining whether channels are available to transmit the subimages to the remote sites.

10. The method of claim 9, comprising:
    transmitting a message to a particular remote site asking whether the particular remote site is to receive subimages transmitted on a channel assigned to another remote site.

11. The method of claim 8, wherein the step of transmitting the subimages comprises transmitting a series of frames of the subimages.

12. A method of displaying images at each of a plurality of remote sites, the method comprising:
    establishing a connection with an image access system;
    receiving a sensed image of a scene to be observed, the sensed image always including the entire sensible range of the image sensor;
    displaying the sensed image;
    selecting a subimage of the sensed image;
    transmitting the selection of the subimage to the image access system;
    receiving the subimage from the image access system; and
    displaying the subimage.

13. The method of claim 12, wherein the step of selecting a subimage comprises:
    panning through the sensed image; and
    indicating a portion of the sensed image to be displayed.

14. The method of claim 12, comprising:
    electing to receive subimages transmitted on a channel assigned to another remote site in response to a message from the image access system.

15. An image access system comprising:
    an image sensor for sensing an image; and
    an image processing system operably coupled to the image sensor, wherein the image processing system receives image data from the image sensor, transmits the sensed image to remote sites, generates subimages of the sensed image, and transmits subimages to the remote sites upon request by the remote sites, the sensed image always including the entire sensible range of the image sensor.

16. The image access system of claim 15, wherein the image processing system comprises:
    a sensor control operably coupled to the image sensor, wherein the sensor control receives the image data from the image sensor.

17. The image access system of claim 16, wherein the image processing system comprises:
    an access control operably coupled to the sensor control and in communication with the remote sites, wherein the access control controls access of the remote sites to the image access system, the generating of subimages, and the transmission of subimages to the remote sites.

18. The image access system of claim 17, wherein the image processing system comprises:
    a processor operably coupled to the access control to receive instructions from the access control, wherein the processor receives image data from the sensor control and formats image data for transmission to the remote sites.

19. The image access system of claim 18, wherein the image processing system comprises:
 a frame buffer operably coupled to the sensor control and to the processor, wherein the frame buffer receives image data from tube sensor and provides image data to the processor.

20. The image access system of claim 15, wherein the image processing system is configured to transmit a message to a particular remote site asking whether the particular remote site is to receive subimages transmitted on a channel assigned to another remote site.

* * * * *

UNITED STATES PATENT AND TRADEMARK OFFICE
CERTIFICATE OF CORRECTION

| | |
|---|---|
| PATENT NO. | : 7,148,914 B2 |
| APPLICATION NO. | : 09/841068 |
| DATED | : December 12, 2006 |
| INVENTOR(S) | : Barry Bronson |

It is certified that error appears in the above-identified patent and that said Letters Patent is hereby corrected as shown below:

In column 10, line 60, delete "modem" and insert -- modern --, therefor.

In column 12, line 61, in Claim 17, delete "generating" and insert -- generation --, therefor.

In column 13, line 7, in Claim 19, delete "tube" and insert -- the --, therefor.

Signed and Sealed this

Fifteenth Day of December, 2009

David J. Kappos
*Director of the United States Patent and Trademark Office*